United States Patent [19]

Ikeda

[11] Patent Number: 4,827,122
[45] Date of Patent: May 2, 1989

[54] ROTATION ANGLE DETECTOR

[75] Inventor: Hiroshi Ikeda, Yokahoma, Japan

[73] Assignee: Nissan Motor Co., Ltd., Yokohama, Japan

[21] Appl. No.: 193,135

[22] Filed: May 6, 1988

Related U.S. Application Data

[63] Continuation of Ser. No. 880,294, Jun. 30, 1986, abandoned.

[30] Foreign Application Priority Data

Jul. 3, 1985 [JP] Japan .................................. 60-144469

[51] Int. Cl.$^4$ .............................................. G01D 5/34
[52] U.S. Cl. .......................... 250/231 SE; 250/237 G
[58] Field of Search .................... 250/231 SE, 237 G; 340/347 P; 356/175, 395

[56] References Cited

U.S. PATENT DOCUMENTS 4,412,745 11/1983 Ohtomo et al. .............. 250/231 SE
4,644,157 2/1987 Ozawa et al. .................... 340/347 P Primary Examiner—David C. Nelms
Attorney, Agent, or Firm—Foley & Lardner, Schwartz, Jeffery, Schwaab, Mack, Blumenthal & Evans

[57] ABSTRACT

An improved rotation angle detector of high precision includes a rotary disc formed with slits and a photo sensor array receiving light through the slits from a light source positioned opposite to the array with the disc in-between. The array consists of a plurality of MOS photo capacitors which can be fabricated with high density. Only discharges of the capacitors due to impinges of light are evaluated to determine where a boundary of the slit is located with respect to the array.

8 Claims, 3 Drawing Sheets

ROTATION ANGLE DETECTOR

This application is a continuation of application Ser. No. 880,294, filed June 30, 1986, now abandoned.

BACKGROUND OF THE INVENTION

1. Field of the Invention

The present invention relates to a rotation angle detector which is used, for instance, as a steering angle sensor for a motor vehicle, in particular to an improvement on the light-receiving unit.

2. Prior Art

A rotation angle detector which is generally called a rotary encoder is a device for measuring the rotation angle as a digital quantity. For implementation of the measurement a circular rotary disc is used having a number of slits which are arranged around the center of rotation with a certain interval between each adjacent slit, and a light source and a light receiving unit with the disc in-between so that, as the disc rotates, the light incident on the receiving unit from the light source is interrupted periodically.

As the light-receiving unit of a prior rotation angle detector, use is made of a photodiode array (PDA) in which a $p^+$ diffused layer for insulating individual photodiodes is formed on an $n^-$ epitaxial layer of a silicon substrate, and photodiodes $P_0$ to $P_9$ each consisting of p—n junction are incorporated in the $p^+$ diffused layer. Because of this, it is difficult to dispose the photodiodes $P_0$ to $P_9$ to form a precisionally dimensioned high density array. This leads to the problem that the accuracy of detection and the resolution of the brightness border line that is projected on the PDA are low. Further, if a finely prepared pattern is used in an attempt to increase the density, there arises a problem that the detected photocurrent becomes minute, lowering the detection sensitivity.

SUMMARY OF THE INVENTION

An object of the invention is to provide a rotation angle detector with high precision.

Another object of the invention is to make it possible to finely fabricate a large number of light-receiving elements for a rotation angle detector without compromising high sensitivity of the elements.

DETAILED DESCRIPTION OF PREFERRED EMBODIMENT

Referring to FIGS. 1 to 5, an embodiment of the present invention will be described in what follows.

Figure 1:
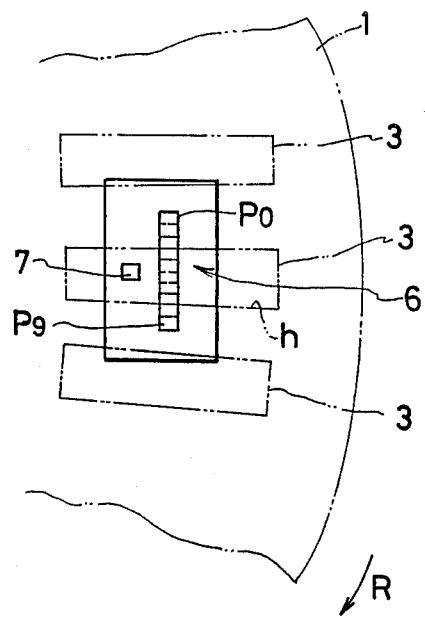
FIG. 1 is perspective view showing a light receiving unit below a rotary disc.

First, a description of the outline of the rotation angle measurement system will be described. As shown in FIG. 1 a light receiving unit 6 is prepared under a circular disc 1 formed with a number of slits 3 which are arranged along a circle having the center of rotation as its center point. The receiving unit 6 comprises an array consisting of a plurality of photo elements $P_0$ to $P_9$ and an independent photo element 7. The photo element 7 is provided only to count the number of the slits passing above it.

Each photo element subsequently detects the light from a light source positioned opposite to the array with the disc in-between and with light passing through the slits. From the positions of the photo elements $P_0$ to $P_9$ detecting the light incident thereon, the rotation angle of the disc can be measured with reference to the number counted by the independent photo element 7.

Figure 2:
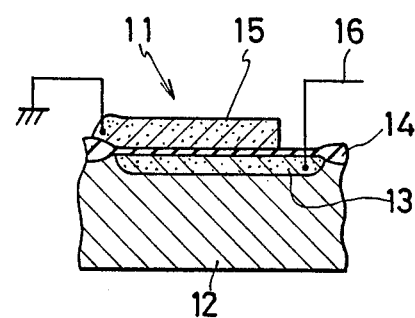
FIG. 2 is a cross section view of a MOS capacitor.

Next, a description of the structure is in order. In the present invention, as the photo element for light-receiving unit 6, use is made of a MOS capacitor type light-receiving element 11 as shown in FIG. 2.

In the MOS capacitor type light-receiving element 11, on a p-type silicon substrate 12 there is formed an $n^+$ diffused layer 13, and over the $n^+$ diffused layer 13 there are laminated an $SiO_2$ insulation film 14 and a conductive polysilicon electrode 15. A MOS capacitor for charge accumulation is formed by the $n^+$ diffused layer 13, the insulation film 14, and the electrode 15. The region of the depletion layer that is formed on the interface between the p-type semiconductor substrate 12 and the $n^+$ diffused layer 13 functions as a light sensing layer. The reference numeral 16 is the output line from the MOS capacitor type light-receiving element 11.

The array of the MOS capacitor type light-receiving elements 11a to 11j that constitute the light-receiving unit 10 is formed by arranging the MOS capacitors in a row on the common p-type semiconductor substrate 12. The precision in dimension of the MOS capacitor type light-receiving element 11 is determined almost solely by the precision in forming the conductive polysilicon electrode 15, so that it is relatively easy to arrange it with high density by the use of a minute pattern that has high precision of dimension.

Figure 3:
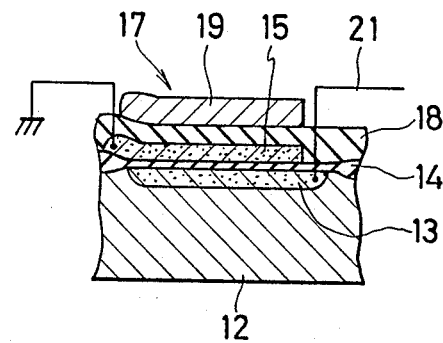
FIG. 3 is a cross section view of a dummy MOS capacitor.

FIG. 3 illustrates a dummy MOS capacitor 17 that is employed to enhance the precision of light detection, as will be described later. On the MOS capacitor structure that is formed approximately similarly to the MOS capacitor type light-receiving element 11 shown in FIG. 1, an $SiO_2$ insulation film 18 is deposited, and over the insulation film 18 there is laminated an Al layer 19 for shielding light. Reference numeral 21 is the output line of the dummy MOS capacitor 17.

Figure 4:
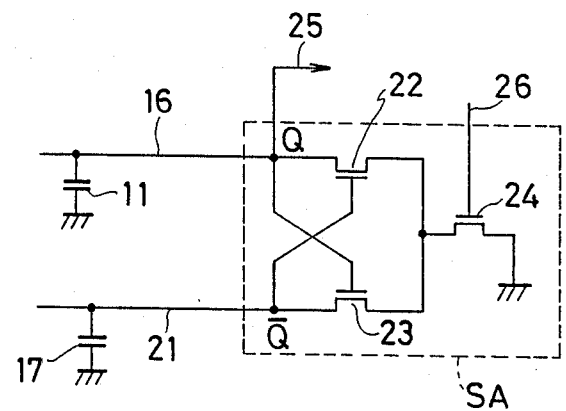
FIG. 4 is a schematic circuit diagram showing a main part of a detector according to the invention.

FIG. 4 shows a sense amplifier SA for amplifying the photoelectric conversion signal from the MOS capacitor type light-receiving element 11. It is composed of a flip-flop circuit that consists of two MOS transistors 22 and 23 and one MOS transistor 24 for sensing. The MOS capacitor type light-receiving element 11 and the MOS capacitor 17 are connected to the Q terminal and the $\overline{Q}$ terminal, respectively, of the sense amplifier SA. Reference numeral 25 is the output line of the sense amplifier SA and 26 is the input line for the clock signal for sensing.

Figure 5:
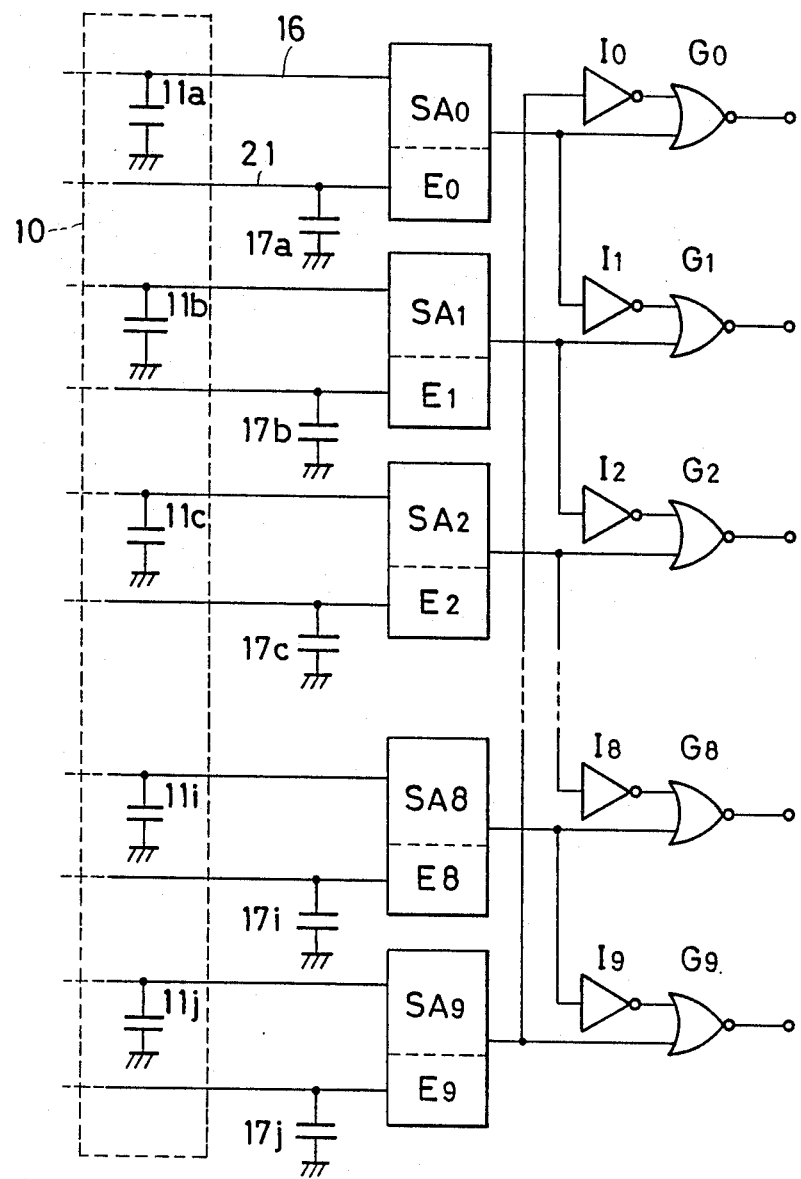
FIG. 5 is a block diagram of a detector according to the invention.

FIG. 5 illustrates the signal processing system in which each of the output lines from the sense amplifiers $SA_0$ to $SA_9$ are connected to one of the input terminals of the respective NOR gates $G_0$ to $G_9$. In the figure, $E_0$ to $E_9$ represent the charging circuits.

Next, the operation of the detector will be described.

Prior to the detection of the rotation angle, the charging circuits $E_0$ to $E_9$ are activated simultaneously, and the MOS capacitor type light-receiving elements 11a to 11j and the dummy MOS capacitors 17a to 17j are charged in advance to the respective required potentials through the signal lines 16 and 21. In so doing, each of the MOS capacitor type light-receiving elements 11a to 11j is charged to a potential that is higher by a predetermined potential than the potential for each of the corresponding dummy MOS capacitors 17a to 17j.

Now suppose that due to the rotation of the rotation disc 1, light impinges through the slit 3 upon the MOS capacitor type light-receiving element 11a while the neighboring MOS capacitor type light-receiving element 11b is in the shadow zone. In the depletion region of the light-receiving element 11a, incident light creates hole-electron pairs which swiftly drift in the opposite directions by means of the electric field and the charge accumulating from the space charge is neutralized by cancelling out the carriers. Eventually, the charges that have been accumulated in the n+ diffused layer 13 escape to the substrate 12, causing the potential that was given in advance to the portion of the MOS capacitor to drop below the potential charged to the dummy MOS capacitor 17a. At this point in time, the input clock to the MOS transistor 24 for sensing is raised to an H level, activating the sense amplifier $SA_0$. Then, the MOS transistor 23 with the high supplied potential is turned on, and a "1" signal is output from the Q terminal.

On the other hand, the neighboring light-receiving element 11b in the shadow is maintaining the initially charged potential as it is. Because of this, when the sense amplifier $SA_1$ is activated similar to the above, the MOS transistor 22 with high supplied potential is turned on, and a "0" signal is output from the Q terminal.

As a result, the "1" signal from the sense amplifier $SA_0$ is input to the NOR gate $G_1$ after being inverted to a "0" signal via the inverter $I_1$. The "0" signal from the sense amplifier $SA_1$ is input directly to the NOR gate $G_1$. Then, from the NOR gate $G_1$ there is output a "1" signal that indicates that the border line of the brightness that corresponds to the edge h of the slit 3 is positioned between the MOS capacitor type light-receiving elements 11a and 11b.

When the border line in the brightness moves over the MOS capacitor type light-receiving elements from 11a to 11b, 11c, and so forth accompanying the rotation of the slit plate 1, there is successively output a "1" signal that represents the information on the rotation angle of the rotation shaft 2, from each of the NOR gates $G_1$, $G_2$, $G_3$, and so forth of the signal processing circuit. Then, the rotation angle of the rotation shaft 2 can be determined based on the rotation angle information and the detected information on the number of passed slits that is detected by the light-receiving element 7. Here, each of the MOS capacitor type light-receiving elements 11a to 11j of the light-receiving unit 10 is arranged with high dimensional precision and with high density. Therefore, it becomes possible to obtain rotation angle information that has high precision, and hence, to measure the rotation angle with high precision.

Furthermore, by the use of the MOS capacitor type light-receiving element employed in the present invention it becomes possible to determine the slit rotation by light dissipate the charge which had been accumulated by other means such as electronic pre-charging. Therefore, it becomes possible to improve the detection sensitivity by finely arranging the slits, compared with the system in which the charges are generated by light through the slit by means, for example, of a photodiode as was done in the past.

As was described in the foregoing, according to the present invention the light-receiving unit for receiving the brightness pattern that is created by a row of slits provided on the rotating slit plate, is formed by arranging, in the same direction as the row of slits, a required number of MOS capacitor type light-receiving elements that output the photoelectric conversion signals for detecting the rotation angle. Therefore, the light-receiving elements can be arranged with high precision of dimension and with high density so that it becomes possible to enhance conspicuously the detection accuracy and the resolution of the border line in the brightness pattern created by the edge of the slit that is projected on the light-receiving unit. Moreover, the amount of the electric charges or the potential difference detected by the MOS capacitor type light-receiving elements can easily be detected with high sensitivity by the simultaneous use of the sense amplifiers.

What is claimed is:

1. A rotation angle detector comprising:
   a rotary member provided with a series of slits at a predetermined pitch in the rotational direction in the circumference of the rotary member;
   a light source for forming a bright and dark pattern corresponding to the slits on one side of the rotary member by emitting light toward the slits from the other side of the rotary member;
   a light receiving means for receiving the bright and dark pattern and outputting a photoelectric converting signal so as to detect a rotation angle of the rotary member;
   the light receiving means having a predetermined number of light receiving elements arranged in the rotational direction corresponding to the slits;
   each of the light receiving elements being of a MOS capacitor type and having a substrate of a first conductivity type, a well region formed in the substrate and having a second conductivity type opposite to the first conductivity type to output the photoelectric converting signal, an insulation film formed on the well region, and a plurality of electrodes formed on the insulation film and made of a material which can be shaped with high precision.

2. The rotation angle detector as claimed in claim 1, wherein the material of the electrodes is a conductive polysilicon.

3. The rotation angle detector as claimed in claim 1, wherein said light receiving means further comprises a predetermined number of dummy capacitors corresponding to the light receiving elements to increase the accuracy of the light detection.

4. The rotation angle detector as claimed in claim 3, wherein each of said dummy capacitors is of a MOS capacitor type and has a substrate of a first conductivity type, a well region formed on the substrate and having a second conductivity type opposite to the first conductivity type to output a signal, a first insulation film formed in the well region, an electrode formed on the first insulation film, a second insulation film formed on the electrode, and a layer formed on the second insulation film to interrupt the light.

5. The rotation angle detector as claimed in claim 4, the material of the electrodes of said dummy capacitors is a conductive polysilicon.

6. A rotation angle detector comprising:
   a rotary member provided with a series of slits at a predetermined pitch in the rotational direction in the circumference of the rotary member;

a light source for forming a bright and dark pattern corresponding to the slits on one side of the rotary member by emitting light toward the slits from the other side of the rotary member;

light receiving means for receiving the bright and dark pattern and for outputting a photoelectric converting signal so as to detect a rotation angle of the rotary member;

a sense amplifier for receiving the photo-electric converting signal to output a digital signal;

the light receiving means having a predetermined number of light receiving elements arranged in the rotational direction corresponding to the slits;

each of the light receiving elements being of a MOS capacitor type and having a substrate of a first conductivity type, a well region formed in the substrate and having a second conductivity type opposite to the first conductivity type to output the photoelectric converting signal, an insulation film formed on the well region, and a plurality of electrodes formed on the insulation film and made of a material which can be shaped with high precision.

7. The rotation angle detector as claimed in claim 6, wherein the sense amplifier comprises a flip-flop circuit for receiving the photoelectric converting signals from the light receiving elements.

8. The rotation angle detector as claimed in claim 6, wherein the material of the electrodes is a conductive polysilicon.

* * * * *